US010619896B2

United States Patent
Burk et al.

(10) Patent No.: US 10,619,896 B2
(45) Date of Patent: Apr. 14, 2020

(54) SORPTION HEAT EXCHANGER MODULE, PREFERABLY FOR A MOTOR VEHICLE

(71) Applicant: MAHLE International GmbH, Stuttgart (DE)

(72) Inventors: Roland Burk, Stuttgart (DE); Lars Ludwig, Altbach (DE)

(73) Assignee: MAHLE International GmbH, Stuttgart (DE)

( * ) Notice: Subject to any disclaimer, the term of this patent is extended or adjusted under 35 U.S.C. 154(b) by 527 days.

(21) Appl. No.: 14/540,650

(22) Filed: Nov. 13, 2014

(65) Prior Publication Data

US 2015/0128639 A1  May 14, 2015

(30) Foreign Application Priority Data

Nov. 13, 2013 (DE) .................... 10 2013 223 118

(51) Int. Cl.
  *F25B 37/00*  (2006.01)
  *F25B 35/04*  (2006.01)
(52) U.S. Cl.
  CPC .............. *F25B 37/00* (2013.01); *F25B 35/04* (2013.01); *Y02A 30/276* (2018.01)
(58) Field of Classification Search
  CPC .......... F25B 37/00; F25B 35/04; F25B 35/00; Y02A 30/276; Y02A 30/278
  See application file for complete search history.

(56) References Cited

U.S. PATENT DOCUMENTS

| 1,881,208 A | | 10/1932 | Masterman | |
|---|---|---|---|---|
| 2,271,565 A | * | 2/1942 | Nelson | F25B 15/10 62/101 |
| 2,319,806 A | * | 5/1943 | Erland Af Kleen | F25B 17/00 62/335 |
| 4,739,631 A | * | 4/1988 | Paeye | F25B 17/08 62/478 |
| 5,205,352 A | * | 4/1993 | Takahashi | F25B 37/00 165/113 |
| 5,339,654 A | * | 8/1994 | Cook | F25B 15/008 62/476 |
| 5,572,885 A | * | 11/1996 | Erickson | F25B 15/02 165/163 |

(Continued)

FOREIGN PATENT DOCUMENTS

| CN | 102022933 A | 9/1983 |
|---|---|---|
| CN | 101490494 A | 7/2009 |

(Continued)

OTHER PUBLICATIONS

EP1106941 Machine translation (Year: 2011).*
Chinese Office Action for Chinese Application No. 201410635518.2 dated Oct. 26, 2017 with English translation.

*Primary Examiner* — Gordon A Jones
(74) *Attorney, Agent, or Firm* — Muncy, Geissler, Olds & Lowe, P.C.

(57) ABSTRACT

A sorption heat exchanger module having a housing, in which a sorption heat exchanger through which a working medium flows is disposed, in which module a housing wall is configured as a heat exchanger structure. In the case of a sorption heat exchanger module in which the presence of passive thermal surfaces is reduced, at least one pipe structure through which a coolant flows is thermally connected with an outside and/or an inside of the housing wall.

14 Claims, 4 Drawing Sheets

(56) References Cited

U.S. PATENT DOCUMENTS

| | | | |
|---|---|---|---|
| 5,660,049 A * | 8/1997 | Erickson | B01D 53/18 62/107 |
| 5,855,121 A | 1/1999 | Byrd et al. | |
| 6,155,073 A | 12/2000 | Gray | |
| 6,672,103 B1 * | 1/2004 | Stach | F28D 20/003 62/480 |
| 6,679,083 B1 * | 1/2004 | Erickson | F25B 37/00 62/476 |
| 8,544,293 B2 * | 10/2013 | Dawoud | F25B 17/08 62/476 |
| 2004/0000164 A1 | 1/2004 | Stach et al. | |
| 2005/0006064 A1 * | 1/2005 | Garimella | F25B 37/00 165/117 |
| 2009/0114380 A1 | 5/2009 | Grabon | |
| 2010/0314084 A1 * | 12/2010 | Takeuchi | F25B 37/00 165/166 |
| 2012/0055194 A1 * | 3/2012 | Bornmann | F25B 17/08 62/477 |
| 2012/0199331 A1 * | 8/2012 | Maurer | F28D 7/024 165/172 |
| 2013/0298991 A1 * | 11/2013 | Parker | C09K 5/02 136/259 |
| 2014/0223955 A1 | 8/2014 | Schiehlen et al. | |

FOREIGN PATENT DOCUMENTS

| | | | | |
|---|---|---|---|---|
| CN | 201706810 U | 1/2011 | | |
| DE | 522 887 | 4/1931 | | |
| DE | 32 08 838 A1 | 9/1983 | | |
| DE | 697 02 522 T2 | 3/2001 | | |
| DE | 199 63 322 A1 | 6/2001 | | |
| DE | 696 22 175 T2 | 3/2003 | | |
| DE | 20 2010 007 821 U1 | 9/2011 | | |
| EP | 1106941 A2 * | 6/2001 | | F25B 37/00 |
| GB | 322226 * | 12/1929 | | |
| WO | WO 2013/011102 A2 | 1/2013 | | |

* cited by examiner

SORPTION HEAT EXCHANGER MODULE, PREFERABLY FOR A MOTOR VEHICLE

This nonprovisional application claims priority to German Patent Application No. DE 10 2013 223 118.0, which was filed in Germany on Nov. 13, 2013, and which is herein incorporated by reference.

BACKGROUND OF THE INVENTION

Field of the Invention

The present invention relates to a sorption heat exchanger module.

Description of the Background Art

In adsorption heat pumps, desorbed adsorptive steam is condensed, giving off heat. Each phase change requires a heat exchanger structure, which offers the differential temperature required for the process of the phase change. Structures that have a low temperature level due to external influences can also lead to condensation of the working medium. If these structures are passive surfaces, the mass of the working medium condensed at the active surfaces decreases, as does its condensation heat. Consequently, the degree of effectiveness of the production process drops.

WO 2013/011102 A2, which corresponds to U.S. 20140223955, which is herein incorporated by reference, describes a concept of a sorption module in which pipe bundles disposed in a common housing are provided for transfer of the adsorption heat and desorption heat to an adsorber structure on the one hand, and for transfer of condensation heat and evaporation heat to a phase-change structure, on the other hand. In this connection, the phase-change structure serves for condensation of working medium steam, storage of condensate, and for re-evaporation after the change to the adsorption phase. The selected block shape of the sorption modules requires complicated and expensive housing concepts, in order to absorb the differential pressures toward the environment. Thermal activation of housing parts for dissipation of condensation heat or feed of condensation heat is therefore difficult to implement technically.

What is called foreign condensation takes place on cool housing parts, causing working medium mass to be lost for the subsequent production process. As the result of vibrations during moving operation of mobile applications, the risk exists that working medium that has already condensed will drip off or be shaken off, and therefore is also lost for the subsequent evaporation process. As a result, the efficiency of the system is worsened.

SUMMARY OF THE INVENTION

It is therefore an object of the present invention to provide a sorption heat exchanger module that implements thermal activation of housing parts for dissipation of condensation heat in simple manner, while at least maintaining the efficiency of the sorption heat exchanger module.

An exemplary embodiment relates to a sorption heat exchanger module comprising a housing in which a sorption heat exchanger through which a heat transfer medium flows is disposed. In this connection, a housing wall of the housing is configured as a further heat exchanger structure, with at least one mantle structure through which a coolant flows being thermally connected with an outside and/or an inside of the housing wall. By means of this configuration, the thermally passive surfaces of the housing wall are activated, thereby minimizing losses in power and degree of efficiency resulting from foreign condensation on passive surfaces, with a corresponding loss in mass of the working medium.

In order to generate the greatest possible proportion of thermally active condensation surface, the thermally activated mantle structure can be configured as a pipe spiral, for example, a helical spiral. This spiral can be configured in multiple loops, which can be disposed closely next to one another, along the housing, thereby increasing the thermally active surface of the housing.

In an embodiment of the invention, the pipe structure can be configured as a multiple spiral. This pipe structure as a multiple spiral can advantageously enclose part of the housing with good thermal contact. In this connection, the multiple spiral can be distributed over approximately the entire surface of the housing, thereby upgrading the housing wall to a thermally active surface.

In an embodiment, a profile of a pipe of the pipe structure can be configured to be angular or round and/or with multiple flow or single flow. Depending on the desired power and pressure loss requirements of the sorption heat exchanger module, the pipe structure can be configured accordingly, in order to guarantee a high degree of efficiency of the sorption heat exchanger module, at reasonable pump power values for the related heat exchanger circuit.

In an embodiment, the pipe structure can be configured as a multi-chamber flat-pipe spiral. Such a multi-chamber flat-pipe spiral can be easily implemented technically and contributes to a high degree of efficiency of the sorption heat exchanger module, particularly if the multi-chamber flat-pipe spiral covers approximately the entire inside or outside of the housing wall.

In an embodiment, the housing mantle can be thermally activated by a cooling cuff, which surrounds part of the housing, particularly a major part of the housing. This cooling cuff can include at least one flat pipe, which encloses the circumference of a housing part, particularly a cylindrical part, at least in part. The flat pipe ends empty into a distributor pipe and a collector pipe, respectively, for feed and discharge of the heat transfer medium flowing in the flat pipes. It is advantageous if the end region of the flat pipe with the distributor pipe and the collector pipe, respectively, is structured in such a manner that force fit between the housing and the cooling cuff can be applied by a clamping element.

In an embodiment, the pipe structure can be configured from a heat-conductive plastic or a metal. In this way, the heat exchange between the coolant and the housing wall that delimits the working medium space is optimized.

In order to guarantee reliable seating and thermal connection of the pipe structure with the housing, the pipe structure can be connected with the housing wall with force fit and/or shape fit and/or material fit.

The pipe structure can be positioned on the housing wall by way of a thermal contact and/or an attachment. In this way, the heat exchange between coolant and working medium is improved, and heat loss is reliably prevented.

In an embodiment, the thermal contact and/or attachment can be, for example, a heat-conductive adhesive, in order to guarantee permanent mechanical contact. A heat-conductive adhesive represents a cost-advantageous contact and attachment, which is easy to handle and advantageously attaches the pipe structure to the housing. By means of the use of a heat-conductive adhesive, not only is the pipe structure attached to the housing, but at the same time, the heat exchange between working medium and coolant is improved.

In an embodiment, the housing is configured similar to a cylinder. A cylinder-like housing shape simplifies installation of a spiral-shaped or cuff-shaped pipe structure, thereby reducing the effort for the assembly process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
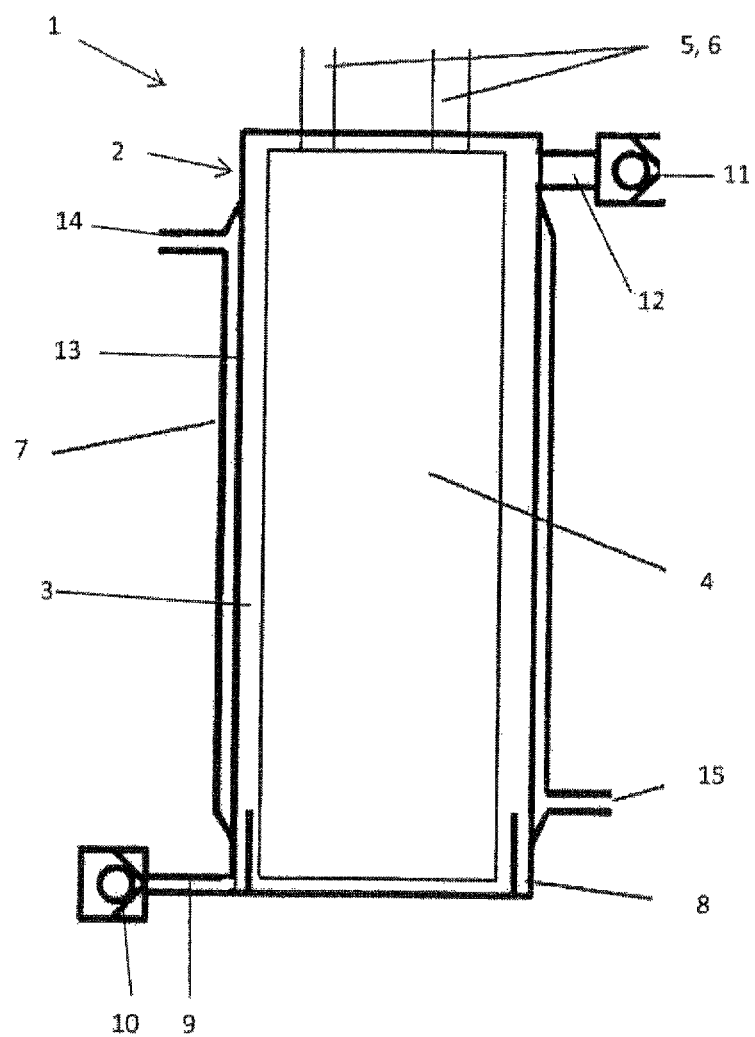
FIG. 1 is an exemplary embodiment of a sorption heat exchanger module according to the invention.

FIG. 1 shows an exemplary embodiment of a sorption heat exchanger module 1. This sorption heat exchanger module 1 has a housing 2, which forms a fluid-tight working medium space 3 in its interior. A sorption heat exchanger 4, which has fluid connectors 5, 6, is disposed within the working medium space 3. A fluid guidance system is formed by the fluid connectors 5, 6, which system stands in thermal contact with an adsorber structure, not shown in any detail. The sorption heat exchanger 4 can have a working medium with a changing temperature flowing through it by way of the at least one inlet 5 and the at least one outlet 6, and the adsorber structure can cycle thermally. A pressure change within the working medium space 3 is caused by means of the desorption and adsorption of the working medium caused in this way.

In the case of the sorption heat exchanger module 1 as explained, its housing 2 is utilized as a condensation surface, in that the housing, together with a structure-stabilizing pipe structure, forms a thermally activated housing mantle 7 through which fluid can flow. This housing mantle is equipped with a second fluid guidance system, which takes up condensation heat that occurs at the housing wall 2 during the desorption phase of the adsorber structure, by means of a coolant flowing through it, and thereby limits the working medium pressure during the desorption phase to the condensation pressure. The coolant circulating in the housing mantle 7 is introduced by way of a condensation heat transfer medium inlet 14 disposed at the top of the housing mantle 7, and discharged by way of a condensation heat transfer medium outlet 15 disposed diagonally on the opposite side of the housing mantle 7.

The thermally activated housing mantle 7 is delimited, within the working medium space 3, at the lower end, by means of a condensate collection device 8. This condensate collection device 8 is preferably configured as a ring channel for taking up the condensate that runs down on the inside of the pipe structure 7 and is collected by the condensate collection device 8. The condensate is passed away to the outside by way of a condensate drain line 9, which contains a kickback valve 10. Furthermore, a suction line connector 12 having a second kickback valve 11 is disposed on the housing 2, for drawing off working medium vapor, with the suction line connector 12 being positioned outside of the pipe structure 7.

Figure 2:
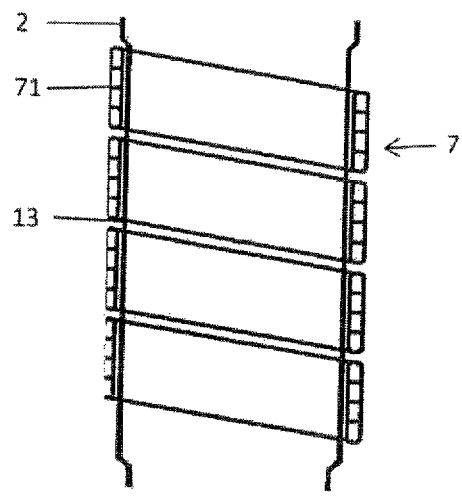
FIG. 2 is an exemplary embodiment of a pipe structure of the sorption heat exchanger module according to the invention.

In FIG. 2, an exemplary embodiment of a thermally activated housing mantle 7 is shown. This is formed by a pipe structure 71 that is structured in the form of a multi-chamber flat-pipe spiral, which encloses the housing 2 on the outside, as a descending spiral. A multi-chamber flat-pipe spiral has a flat pipe that has a rectangular cross-section, with the coolant flowing within the flat pipe, in multiple channels formed in the interior of the flat pipe.

In this connection, the individual loops of the multi-chamber flat-pipe spiral 71 are disposed closely next to one another, so that a major portion of the housing wall 13 of the housing 2 is covered by this multi-chamber flat-pipe spiral, thereby forming a thermally active housing surface. The pipe structure 71 can be connected with the housing 2 by means of force fit, shape fit or material fit.

Figure 3:
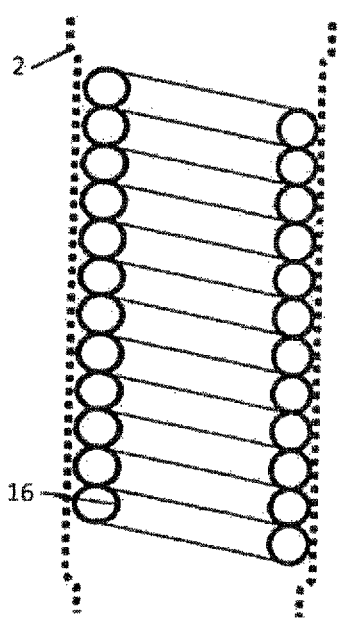
FIG. 3 is an exemplary embodiment of a pipe structure of the sorption heat exchanger module according to the invention, FIG. 4 a further exemplary embodiment of a pipe structure of the sorption heat exchanger module according to the invention.

In order to temper the housing wall 13 more homogeneously, a multiple spiral 16 is shown in FIG. 3, which lies against the inside of the housing wall 13 of the housing 2. In this case, too, a thermally active housing wall 13 of the housing 2 is implemented by means of the close next-to-one-another positioning of the individual loops of the multiple spiral 16, with a pipe that forms the multiple spiral 16 having a round cross-section.

Figure 4:
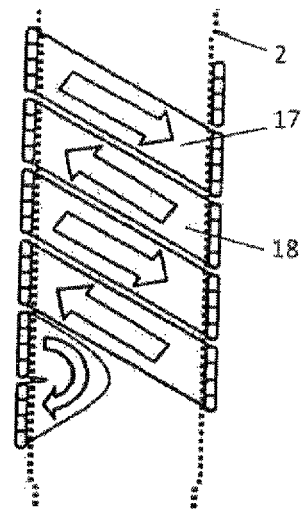

FIG. 4 shows a further exemplary embodiment of the pipe structure, in which at least two pipe spirals 17, 18 configured as multi-chamber flat-pipe spirals are positioned around the housing 2, alternating with one another. The coolant flows in one direction in the first pipe spiral 17, while the coolant in the second pipe spiral 18 is transported in the opposite direction. In this connection, the through-flow direction is indicated with arrows.

Figure 5:
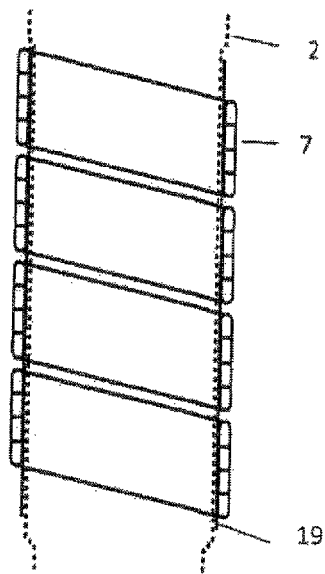
FIG. 5 is an exemplary embodiment of the pipe structure of the sorption heat exchanger module according to the invention, FIG. 6 a view of an exemplary embodiment in a perspective representation.

A further embodiment of the pipe structure 7 is shown in FIG. 5. The cylindrical housing 2, which is enclosed, in spiral shape, by a heat exchanger cuff in the form of a flat-pipe multi-chamber spiral 7, is attached to the housing 2 by way of a heat-conductive adhesive 19. In this way, a simple and nevertheless well heat-conductive connection between the housing wall 13 and the multi-chamber flat-pipe spiral 7 is formed.

Figure 7:
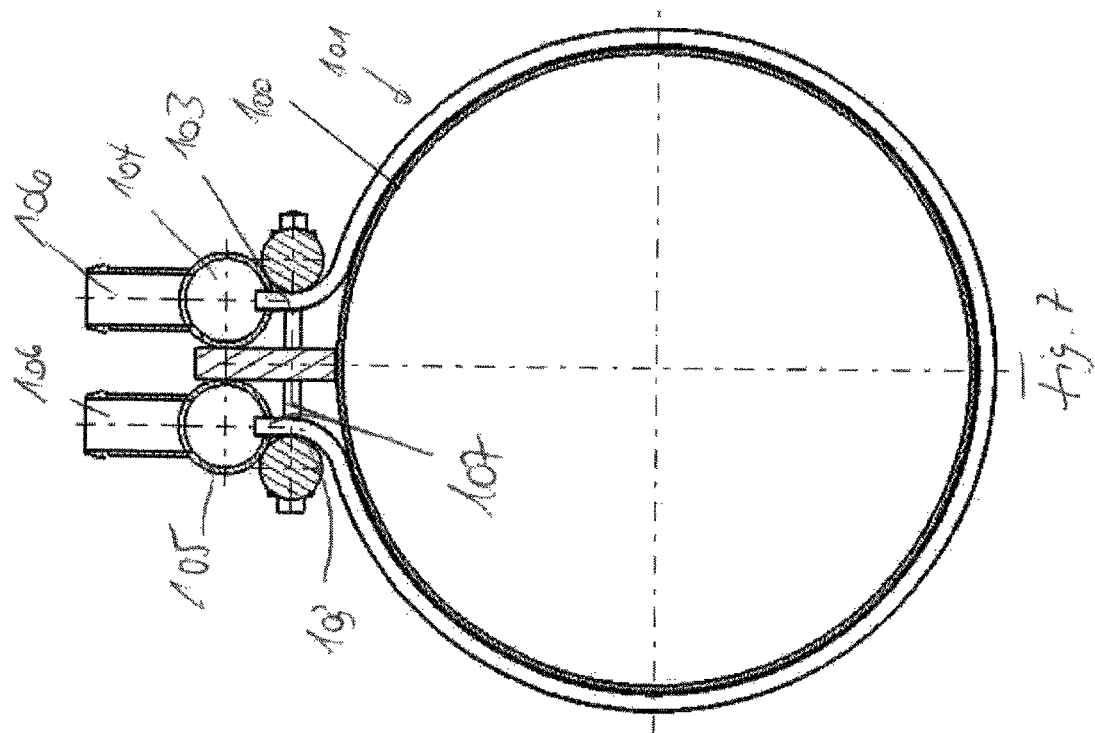
FIG. 7 is a sectional view of the exemplary embodiment according to FIG. 6.
Figure 6:
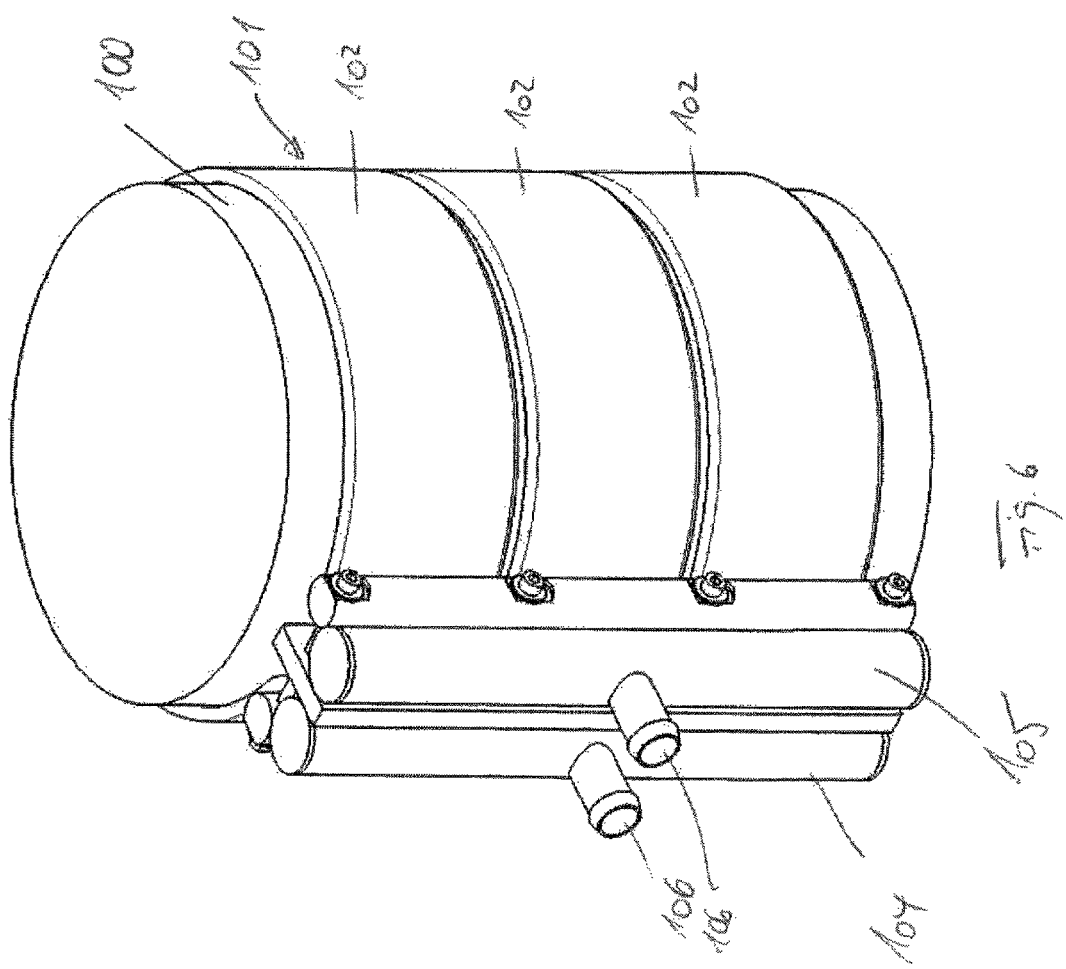

FIGS. 6 and 7 show a further embodiment of the invention, in which the housing mantle 100 is thermally activated by means of a cooling cuff 101, which encloses part of the housing or of the housing mantle 100. In this connection, it can be seen that the cooling cuff 101 encloses the housing mantle almost completely.

The cooling cuff 101 has at least one flat pipe 102, with three flat pipes 102 being shown in FIG. 6, which are disposed adjacent to one another in the longitudinal direction of the housing mantle 100. In this connection, the flat pipes 102 of the cuff 101 enclose the circumference of the housing, particularly a cylindrical housing, or of a housing part at least in part, so that they essentially lie against a part of the circumference or essentially against the entire circumference of the housing 100.

The flat pipe ends 103 of the flat pipes 102 empty into a distributor pipe 104 and into a collector pipe 105 for feed and discharge of the heat transfer medium that flows in the flat pipes 102. The distributor and collector pipes 104, 105 run perpendicular to a horizontal plane of the housing, so that the flat pipes are connected with the distributor pipe or collector pipe next to one another. Connector pieces 106 are affixed to the distributor pipe and the collector pipe 104, 105, in each instance, in order to allow a fluid to flow in and out.

It is advantageous if the end region 103 of the flat pipes 102 with the distributor pipe or collector pipe 104, 105 is structured in such a manner that force fit between the housing 100 and the cooling cuff 101 can be applied by means of a clamping element 107.

The invention is not restricted to the pipe structures described. The pipe structures can have the most varied shapes. It is advantageous if the pipe structures is formed of a thermally conductive plastic or metal. Furthermore, the shape of the housing can be configured differently. Aside from the cylindrical shape mentioned, a prismatic or conical configuration is also possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adsorption heat exchanger module comprising:
a housing in which an adsorption heat exchanger through which a working medium flows is disposed, a housing wall being configured as a heat exchanger structure;
at least one mantle structure through which a coolant flows is thermally connected with an outside of the housing wall; and
a condensate collection device disposed at a lower end of the housing, the condensate collection device collecting condensation formed at the housing wall due to a thermal connection between the at least one mantle structure and the housing wall and the condensate collection device having a condensate drain line that extends from the condensate collection device to an outside of the housing, such that the condensate drain line carries the collected condensation to the outside of the housing,
wherein the condensate collection device is provided inside of the housing and the at least one mantle structure is provided outside of the housing,
wherein the adsorption heat exchanger is spaced apart from the housing, such that an interior wall side of the housing wall is spaced apart from all surfaces of the adsorption heat exchanger, wherein the adsorption heat exchanger has a working medium inlet and a working medium outlet, the working medium inlet and the working medium outlet each extending through an upper end of the housing and directly connecting to an upper end of the adsorption heat exchanger, wherein the housing has a working medium vapor suction line extending from the housing at the upper end of the housing and wherein the at least one mantle structure has a coolant inlet and a coolant outlet.

2. The adsorption heat exchanger module according to claim 1, wherein the at least one mantle structure is a pipe structure.

3. The adsorption heat exchanger module according to claim 2, wherein the pipe structure is configured as a pipe spiral, as a multiple spiral, or in a helical shape.

4. The adsorption heat exchanger module according to claim 2, wherein the pipe structure is formed as a pipe mantle with at least one flat pipe, which is fluid-connected with a distributor pipe and a collector pipe.

5. The adsorption heat exchanger module according to claim 2, wherein a profile of a pipe of the pipe structure is angular or round.

6. The adsorption heat exchanger module according to claim 2, wherein the pipe structure is configured as a multi-chamber flat-pipe spiral.

7. The adsorption heat exchanger module according to claim 2, wherein the pipe structure is made of a heat-conductive plastic or a metal.

8. The adsorption heat exchanger module according to claim 2, wherein the pipe structure is connected with the housing wall via force fit or shape fit or material fit.

9. The adsorption heat exchanger module according to claim 2, wherein the pipe structure is positioned on the housing wall via a thermal contact or an attachment.

10. The adsorption heat exchanger module according to claim 9, wherein the thermal contact or the attachment is a heat-conductive adhesive.

11. The adsorption heat exchanger module according to claim 1, wherein the housing is configured as a cylinder.

12. The adsorption heat exchanger module according to claim 2, wherein the housing wall has an exterior wall side and the interior wall side, and wherein the pipe structure is a single, cylindrical sleeve through which the coolant flows, the sleeve surrounding and contacting the exterior wall side of the housing wall, such that the sleeve is provided entirely at an exterior of the housing.

13. The adsorption heat exchanger module according to claim 1, wherein the at least one mantle structure does not directly contact the working medium.

14. The adsorption heat exchanger module according to claim 1, wherein the at least one mantle structure directly connects to an exterior wall side of the housing wall.

\* \* \* \* \*